United States Patent

Doerfling

[15] 3,645,503
[45] Feb. 29, 1972

[54] CABLE CONTROL UNIT
[72] Inventor: Ralph G. Doerfling, Walled Lake, Mich.
[73] Assignee: Superwich, Inc., Pomfret, Conn.
[22] Filed: Aug. 13, 1970
[21] Appl. No.: 63,418

[52] U.S. Cl. ........................ 254/197, 242/83.43, 254/190 R
[51] Int. Cl. ........................................................... B66d 1/38
[58] Field of Search ...................... 254/175 R, 190, 197, 198;
214/85.5; 242/84.21, 84.41, 84.43, 149, 150, 156, 156.1, 158.4

[56] References Cited

UNITED STATES PATENTS

| | | |
|---|---|---|
| 3,051,447 | 8/1962 | Ahlbin .................................. 254/187 |
| 1,654,667 | 1/1928 | Russell ................................ 242/84.43 |
| 2,143,481 | 1/1939 | Hall ..................................... 242/156.1 |
| 3,474,922 | 10/1969 | Wood et al. .......................... 214/85.5 |

Primary Examiner—Joseph Wegbreit
Assistant Examiner—Johnny D. Cherry
Attorney—Prutzman, Hayes, Kalb & Chilton

[57] ABSTRACT

A winch assembly particularly suitable for use in connection with boat trailers comprising a flanged spool having a cable wrapped therearound which is maintained in appropriate helically wound superimposed layers by means of a cable control unit pivotally mounted about the axis of rotation of the spool, which further serves as a safety guard and also prevents an unraveling of the cable from around the spool when tension is removed from the cable.

8 Claims, 4 Drawing Figures

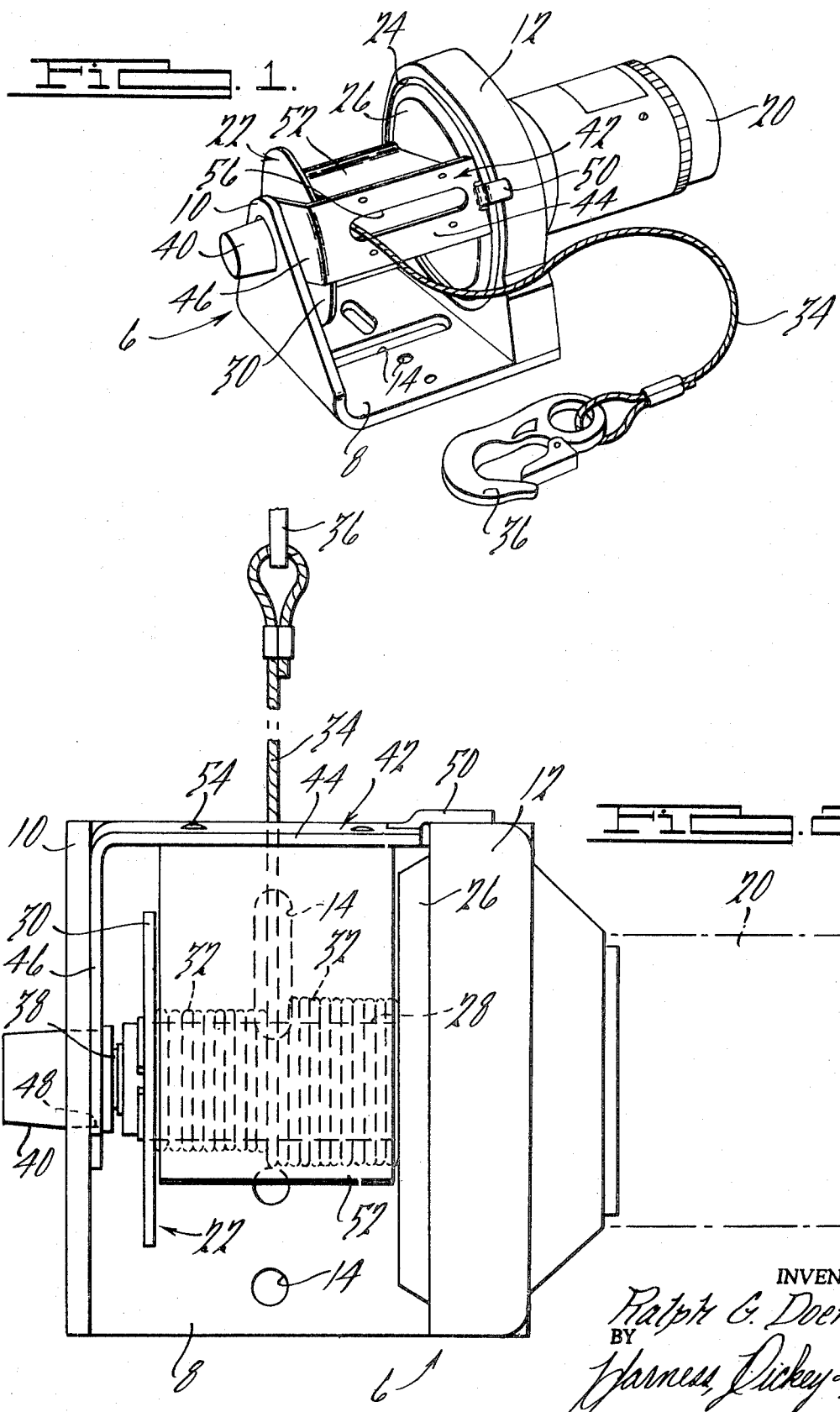

Patented Feb. 29, 1972
3,645,503
2 Sheets-Sheet 2
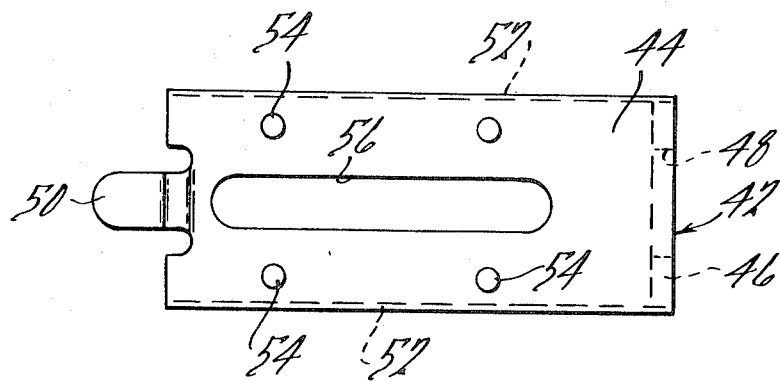
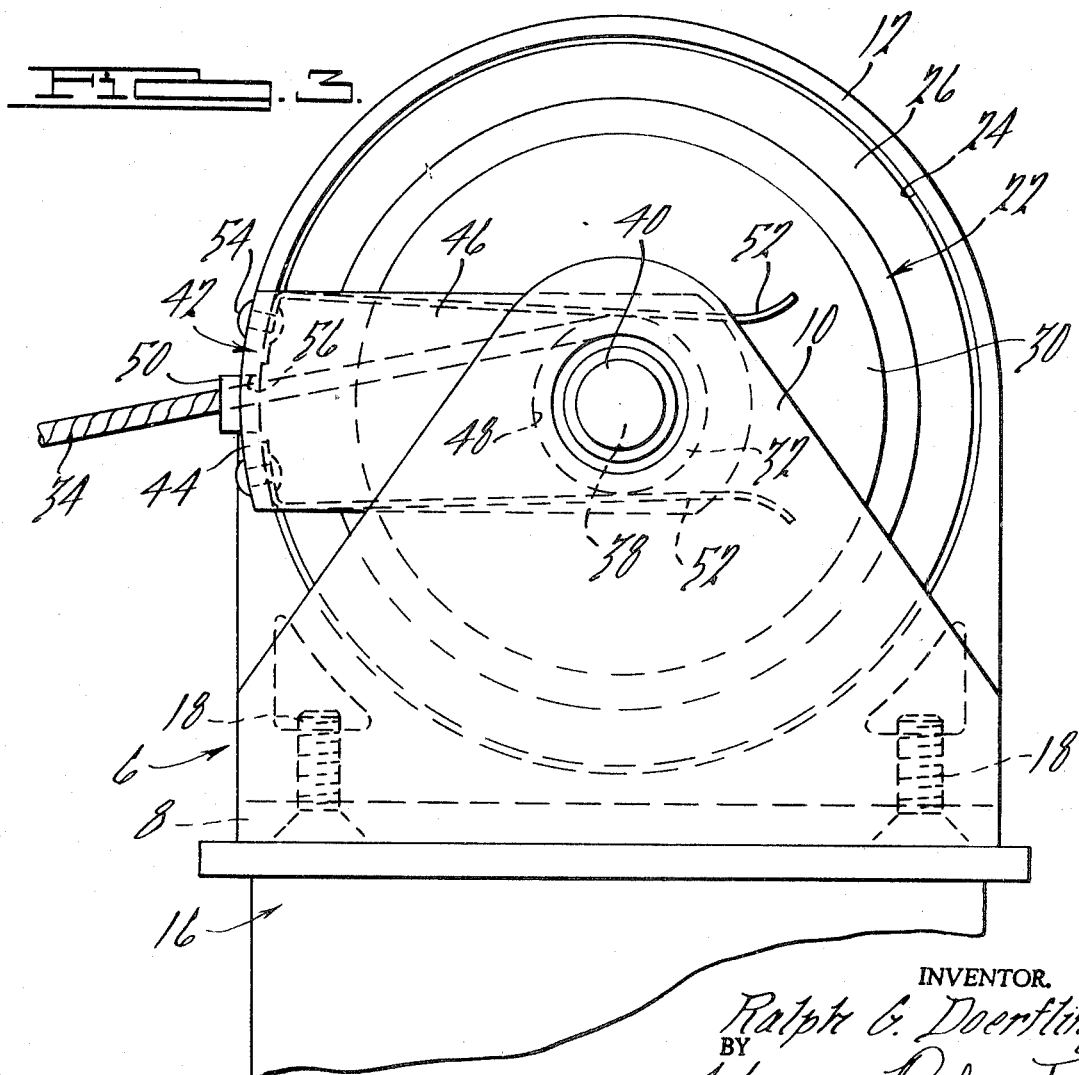
INVENTOR.
Ralph G. Doerfling.
BY
Harness, Dickey & Pierce
ATTORNEYS.

3,645,503

CABLE CONTROL UNIT

BACKGROUND OF THE INVENTION

The cable control unit comprising the present invention is particularly applicable for use on small winch assemblies of the type employed on boat trailers but also can be satisfactorily used with any one of a variety of comparable winch constructions to provide the plural functions of guiding the cable during a winding or unwinding thereof, maintaining the cable in an appropriate wound condition around the cable spool when tension is removed from the working end of the cable, as well as serving as a safety guard. The increased popularity of power winch mechanisms for use in pulling relatively large and heavy boats onto the beds of boat trailers, necessitating the use of steel cables in lieu of synthetic fibrous lines, has occasioned an increased need for an economical and simple device which can be incorporated on such power winches for not only providing guidance of the cable during the winding and unwinding thereof, but also shielding potentially dangerous sections from accidental contact by the operator and children, as well as other foreign objects.

Typical of a powerized boat trailer winch to which the present invention is applicable is the winch assembly described in U.S. Pat. No. 3,474,922, the subject matter of which is incorporated herein by reference. The cable control unit comprising the present invention also finds utility and provides substantial benefits and safety when installed on manual-type winches of the various types well known in the art provided with a manually operated crank handle. In each instance, the cable control unit comprising the present invention is of low cost, of durable and reliable performance, of simple installation and of extreme versatility enabling its adaptation to a variety of different sizes and types of manual and power driven winches.

SUMMARY OF THE INVENTION

The benefits and advantages of the present invention are achieved by a winch assembly which comprises a frame having a flanged spool rotatably mounted thereon, around which a cable is adapted to extend in a plurality of overlying, helically wound layers and having the working end thereof extending substantially tangentially from the spool, to the end of which a suitable shackle or hook is customarily affixed for removably connecting it to a load. The cable control unit is mounted on the frame for pivoting movement about the axis of rotation of the spool and is comprised of a bight section which is radially spaced from the core of the spool, which is formed with an aperture through which the working end of the cable extends. A pair of leg portions are connected to the bight section and extend in spaced relationship therefrom toward the core and are disposed in overlying sliding clamping contact against opposite portions of the outermost layer of windings of the cable on the core. The disposition of the guide aperture in bight section relative to the ends of the core of the winding spool is such that an automatic reversal in the winding of the cable occurs after one layer of wind has been completed.

Still other advantages and benefits of the present invention will become apparent upon a reading of the description of the preferred embodiments taken in conjunction with the accompanying drawings.

BRIEF DESCRIPTION OF THE DRAWINGS

FIG. 1 is a perspective view of a winch assembly incorporating the cable control unit in accordance with the preferred embodiments of the present invention;

FIG. 2 is a magnified fragmentary plan view of the winch assembly shown in FIG. 1;

FIG. 3 is a fragmentary side elevational view of the winch assembly shown in FIG. 2; and FIG. 4 is a plan view of the exterior face of the bight section of the cable control unit showing the disposition of the guide aperture therethrough.

DESCRIPTION OF THE PREFERRED EMBODIMENTS

Referring now in detail to the drawings, a power winch assembly is illustrated in FIG. 1 which is typical of the variety of winch mechanisms to which the cable control unit comprising the present invention is applicable. As shown in the drawings, the winch mechanism, generally indicated at 6, comprises a frame including a base plate 8 having an integrally formed, upwardly extending end plate 10 at one end thereof and a gear housing 12 at the other end thereof. The base plate 8 is formed with a series of apertures 14 for appropriately mounting the winch mechanism on a suitable platform or base located at the forward end of a boat trailer or the like such as the base 16 fragmentarily shown in FIG. 3.

In the exemplary winch mechanism illustrated, the gear housing 12 is affixed to the baseplate 8 such as by means of two machine screws 18, as shown in FIG. 3. The upper portion of the gear housing 12 is of a circular configuration, providing arcuate guidance of the cable control unit in a manner subsequently to be described. Within the gear housing 12 is a suitable gear reduction unit which drivingly couples an electric motor 20 mounted on the exterior face of the housing to a flanged spool or drum 22 rotatably mounted between the gear housing and opposed end plate 10. The face of the gear housing adjacent to the flanged spool 22 is formed with a circular aperture 24 which is disposed concentric with and is adapted to accommodate the recessed circular end flange 26 affixed to one end of a core 28 of the flanged spool 22. A circular end flange 30 is affixed to the opposite end of the core 28 of the flanged spool, between which helically wound layers, indicated at 32, of a rope or cable 34 are adapted to be wound. As shown in FIGS. 1 and 2, the working end of the cable 34 is adapted to be provided with a suitable shackle or hook 36 for connecting the winch mechanism to a load such as a floating boat.

The flanged spool is rotatably driven by the reversible electric motor 20 in either direction through the gear reduction incorporated in the gear housing 12 so as to effect a winding and unwinding of the cable as desired. The flanged spool itself is rotatably supported on a shaft 38, one end of which projects outwardly of and is supported at the upper end of the end plate 10. The projecting end of the shaft 38 is formed with a suitable removable protective cover 40, which overlies the shaped end of the shaft which is adapted to receive and removably engage a manual crank handle (not shown), enabling manual winding and unwinding of the flanged spool and cable thereon in the event of a power or motor failure, or as may otherwise be desired.

As will be apparent from the drawings, a winding of the cable 34 in a series of overlying helically wound layers 32, as best seen in FIG. 2, assures a proper winding and unwinding of the cable from the flanged spool without any entanglement or snarling thereof. This not only assures appropriate movement of the load but also minimizes wear on the cable itself. High-strength metallic cables, such as stainless steel cables, as well as certain tightly woven synthetic lines, have a tendency, when tension is released from the free end thereof, such as in the situation shown in FIG. 1, to unravel or "bird nest" on the core. Such unraveling produces a situation conducive to snarling and/or tangling of the cable upon subsequent use.

The foregoing problems are overcome in accordance with the cable control unit comprising the present invention which is designated by the numeral 42 in the drawings. As shown in the drawings, the cable control unit 42 comprises a bight section 44, which is disposed radially outwardly of the core and the wound layers of cable therearound and extends longitudinally of the length thereof between the end flanges of the flanged spool. An arm 46 formed with an aperture 48 through the end thereof is integrally affixed to the bight section 44 and is mounted around the shaft for providing pivoting movement of the bight section substantially about the axis of rotation of the flanged spool. The aperture 48 is disposed in clearance relationship relative to the shaft in order that the cable control unit "floats" through an arc depending on the angle at which the free end of the cable extends from the core of the spool. Further arcuate guidance of the cable control unit is provided by an ear 50 affixed to and extending laterally of the free end of the bight section which overlies the peripheral circular surface of the gear housing 12 and is adapted to be disposed in sliding guided contact thereagainst.

A pair of flexible legs 52 which are comprised of spring steel or other suitable tension exerting material such as various plastic materials, for example, are affixed such as by rivets 54 to opposite edges of the bight section 44 and extend inwardly in spaced relationship toward the core and are disposed in overlying sliding clamping contact against opposite sides of the outermost wound layer 32 of cable therearound. The manner of mounting the legs 52 is such that they are continuously biased toward each other, thereby serving to maintain a firm pressure against the helically wound layers of cable, preventing an unraveling or outward bird-nesting thereof when tension is released from the free end of the cable. The overlying sliding contact of the legs further facilitates the winding of the cable in an appropriate helically wound pattern across the entire length of the core between the opposing faces of the end flanges. As will be further noted, the legs 52 are of a transverse width such that the side edges thereof are disposed in clearance relationship relative to the adjacent end flange surface so that substantially all winding of the cable, including the terminal windings, are in contact therewith.

As best seen in FIG. 4, the bight section 44 is formed with an elongated guide aperture 56 which extends longitudinally thereof and is of a length of approximately two cable diameters shorter than the width between the inner surface of the end flanges of the flanged spool. The free end of the cable extends through the guide aperture 56 and serves to floatingly support the cable control unit in the appropriate angularly pivoted position, depending on the direction in which the free end of the cable extends. As will be further noted, the cable extends in a tangential direction from the core of the spool and between the two resilient legs 52 such that it is substantially completely shielded at the point of winding and unwinding, thereby preventing any inadvertent or accidental entrapment of objects between the cable and core during a winding operation.

In accordance with the foregoing arrangement, upon a winding of the cable, such as during the pulling of a floating boat onto the bed of a boat trailer, the overlying clamping relationship of the two resiliently biased legs 52 assures a uniform side-by-side helical wrapping of the cable across the length of the core and upon reaching a point adjacent to the end flange thereon, is induced by virtue of the end of the guide aperture to commence a wrapping in an opposite direction upon completion of that wound layer. The free pivoting movement of the cable control unit enables angular changes thereof in accordance with variation in the angle of the free end of the cable as dictated by the position of the load. At the completion of the winding operation or unwinding operation and a release of the load, the neatly and tightly wound layers of cable around the core are retained in that position by the clamping pressure of the leg portions.

While it will be apparent that the invention herein disclosed is well calculated to fulfill the objects hereinbefore stated, it will be appreciated that the invention is susceptible to modification, variation and change without departing from the spirit thereof.

What is claimed is:

1. A winch assembly comprising a frame, a flanged spool having an elongated core and a pair of spaced end flanges rotatably mounted on said frame, a cable adapted to extend in plural helically wound layers about said core between said flanges, and a cable control unit mounted on said frame for pivoting movement generally about the axis of rotation of said spool and comprising a bight section radially spaced from said core and formed with a guide aperture therethrough, said bight second having a pair of leg portions extending inwardly in spaced relationship toward said core with the end portion thereof disposed in overlying sliding clamping contact against opposite sides of the outermost wound layer of cable on said core, the free end of said cable adapted to extend from said core between said leg portions and through said guide aperture providing guidance for said cable during a winding and unwinding thereof.

2. The winch assembly as defined in claim 1, in which said guide aperture is of an elongated shape having its major dimension extending in a direction substantially parallel to the axis of rotation of said core and having the ends thereof terminating at a point spaced inwardly of the inner surfaces of said end flanges.

3. The winch assembly as defined in claim 1, wherein said cable control unit further includes an arm affixed to said bight section that extends radially inwardly therefrom and is pivotally connected to said frame.

4. The winch assembly as defined in claim 1, wherein said leg portions of said cable control unit are of a width at least at the end portions thereof so as to overlie substantially the entire length of said core and said wound layers of cable thereon.

5. The winch assembly as defined in claim 1, wherein said leg portions of said cable control unit are mounted in converging biased relationship for clamping said core and said wound layers of cable therebetween.

6. The winch assembly as defined in claim 1, wherein said leg portions are comprised of resilient sheets mounted in converging biased relationship for clamping said core and said wound layers of cable therebetween.

7. The winch assembly as defined in claim 6, wherein said leg portions are comprised of spring steel and extend across the full length of said core between said end flanges.

8. The winch assembly as defined in claim 1, wherein said frame includes a housing formed with a circular portion positioned concentric with the axis of rotation of said spool and said cable control unit includes guide means disposed in sliding guided contact against said circular portion during the pivoting movement thereof.

* * * * *